United States Patent
Krause et al.

(10) Patent No.: US 9,866,085 B2
(45) Date of Patent: Jan. 9, 2018

(54) GENERATOR MOTOR WEDGE WITH WIDE ARM SPAN AND REDUCED STRESS LEVELS

(71) Applicant: Hamilton Sundstrand Corporation, Charlotte, NC (US)

(72) Inventors: Joseph Paul Krause, Downers Grove, IL (US); Dhaval Patel, Loves Park, IL (US); Jan Henry Abels, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 595 days.

(21) Appl. No.: 14/512,676

(22) Filed: Oct. 13, 2014

(65) Prior Publication Data

US 2016/0105058 A1 Apr. 14, 2016

(51) Int. Cl.
*H02K 3/48* (2006.01)
*H02K 3/52* (2006.01)

(52) U.S. Cl.
CPC ......... *H02K 3/527* (2013.01); *H02K 2213/03* (2013.01)

(58) Field of Classification Search
CPC .... H02K 3/527; H02K 2213/03; H02K 3/487; H02K 3/493; H02K 3/48
USPC ........................................................ 310/214
See application file for complete search history.

(56) References Cited

U.S. PATENT DOCUMENTS

| | | | |
|---|---|---|---|
| 6,113,024 A * | 9/2000 | Pittard | H02K 3/527 242/433 |
| 6,933,648 B2 | 8/2005 | Buchan et al. | |
| 6,984,910 B2 * | 1/2006 | Down | H02K 3/527 310/192 |
| 8,018,114 B2 | 9/2011 | Rasmussen et al. | |
| 8,232,702 B2 | 7/2012 | Zywot et al. | |
| 8,853,911 B2 | 10/2014 | Lemmers, Jr. | |
| 2010/0133946 A1 * | 6/2010 | Lemmers, Jr. | H02K 3/527 310/214 |
| 2010/0244614 A1 * | 9/2010 | Rasmussen | H02K 3/487 310/214 |
| 2011/0291518 A1 * | 12/2011 | McCabe | H02K 3/527 310/214 |
| 2013/0293055 A1 | 11/2013 | Coldwate et al. | |

FOREIGN PATENT DOCUMENTS

| | | |
|---|---|---|
| CN | 201839179 U | 5/2011 |
| EP | 2713482 A2 | 4/2014 |

OTHER PUBLICATIONS

European Search Report for European Application No. 15188918.5 dated May 9, 2016.

* cited by examiner

*Primary Examiner* — Hanh Nguyen
(74) *Attorney, Agent, or Firm* — Carlson, Gaskey & Olds, PC

(57) ABSTRACT

A wedge for use in an electric machine has a central leg and arms extending in both circumferential directions. The wedge has a radially outer full surface defining a cylindrical aperture through an axial length, and ledge surfaces at each axial end of the full surface. A curved merging portion on an outer surface of the arms merges into a curved contact surface. A rotor, a machine and a method are also disclosed.

20 Claims, 3 Drawing Sheets

GENERATOR MOTOR WEDGE WITH WIDE ARM SPAN AND REDUCED STRESS LEVELS

BACKGROUND OF THE INVENTION

This application relates to an interface between a generator/motor wedge and pole tips on a lamination retaining the wedge and coils.

Generators/motors are known, and may include a lamination stack having poles that receive wound field coils. Wedges are generally placed to separate and support the field coils.

In one known type of generator/motor, the lamination stack includes pole tips, which define a channel that captures a portion of the wedge and the field coils. In this prior art generator/motor, an interface surface between the pole tips and the wedges is generally polygonal, or along straight surfaces.

During operation, the generator/motor rotor may rotate at very high speeds, and thus there are centrifugal forces placed on the pole tips, the coils and the wedges. In particular, the wedge and coil may move away from a designed position, and the interface between the wedge and the pole tip may no longer be along the desired straight surface. In some applications, the pole tip has contacted a surface of the wedge spaced circumferentially away from the desired contact surface.

This undesired contact location creates a stress lever arm which is relatively long.

It has been proposed to include a curved surface on the arms.

SUMMARY OF THE INVENTION

A wedge for use in an electric machine has a central leg extending in a direction that will be radially inward when the wedge is mounted on a lamination stack. The wedge has arms extending in both circumferential directions from the central leg, with a circumferentially outermost part of the arms having a curved contact surface that will be radially outward, and a flat inner surface that will be radially inward when the wedge is mounted in the lamination stack. The wedge has a radially outer full surface defining a cylindrical aperture through an axial length of the wedge. There are ledge surfaces at each axial end of the full surface of the wedge. A curved merging portion on an outer surface of the arms merges into the curved contact surface. The curved merging portion is formed on a radius of curvature centered from a point that will be spaced radially outwardly of the arm when the wedge is mounted on a lamination stack. The curved contact portion is formed about a radius of curvature centered from a point that will be spaced radially inwardly of the curved contact surface when the wedge is mounted on a lamination stack.

A rotor, a machine and a method are also disclosed.

These and other features of the invention may be best understood from the following specification and drawings, the following of which is a brief description.

DETAILED DESCRIPTION

Figure 1:
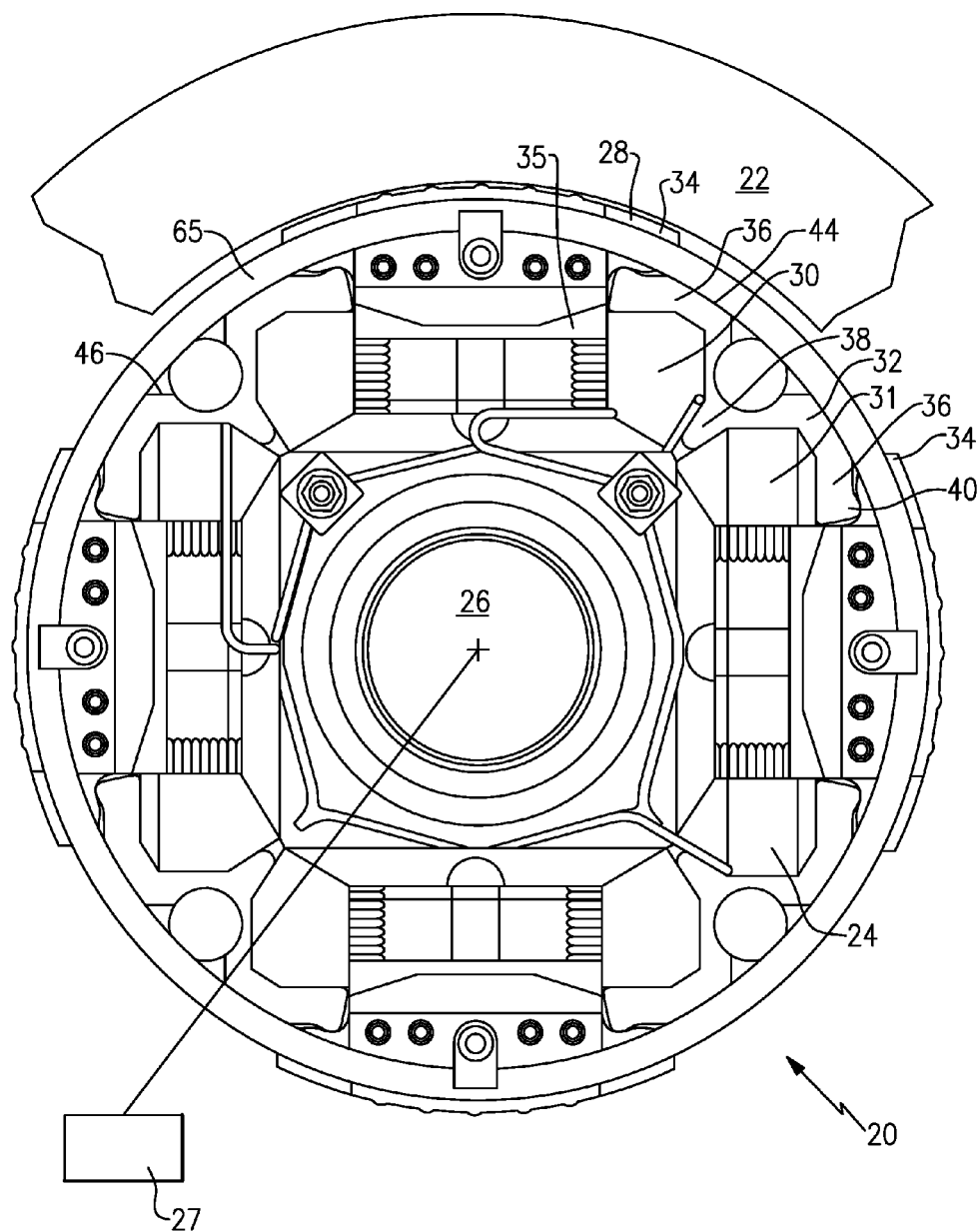
FIG. 1 shows a generator/motor in section.

FIG. 1 shows a cross-section of a machine 20 that may operate as a generator or a motor. As known, a rotor 24 includes a central shaft 26, which is driven to rotate by a source of rotation, such as a gas turbine engine 27 (shown schematically) and adjacent to a stator 22 (shown schematically) to generate electricity. The rotor 24 includes a lamination stack 28 having poles 35 with circumferentially extending wedges 32. The wedges 32 sit in a channel radially inwardly of circumferentially opposed pole tips 34 on poles 35. The channels receive field coils or windings 30 and 31, which are wound around the poles 35.

The wedge 32 separates and supports adjacent coils 30 and 31. In this design, the wedge 32 has a central leg 38 extending radially inwardly between adjacent coils 30 and 31, and arms 36 extending circumferentially to sit underneath the pole tips 34. The central leg 38 may be significantly shorter in some applications. In the wedge 32 illustrated in FIG. 1, a circumferentially outermost portion 40 of the wedge has a generally curved contact surface interface with the pole tip 34, for purposes to be described below.

A band 65 sits on a ledge 44 and secures the wedges 32.

Figure 2:
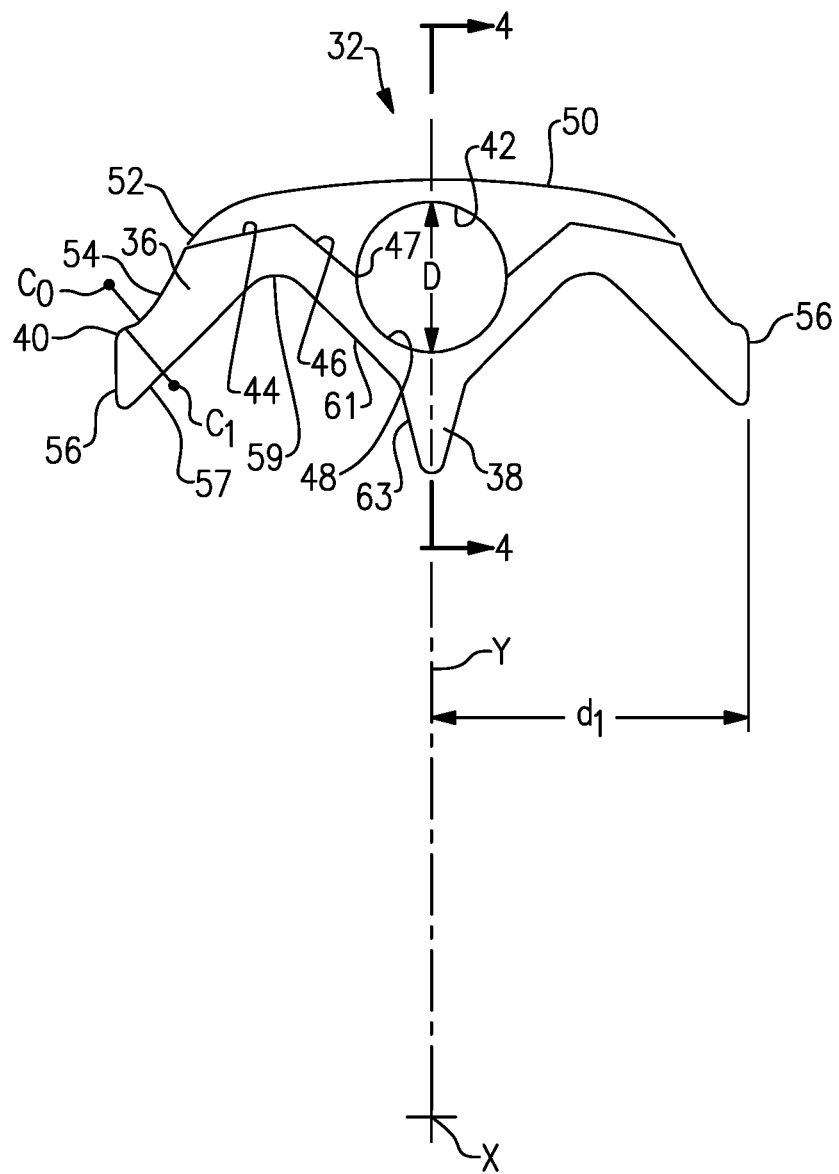
FIG. 2 shows a wedge.

FIG. 2 shows wedge 32 having a radially outer full surface 50 extending into a curve 52 which begins circumferentially extending arms 36. The arms 36 extend for a relatively wide distance. Arm 36 includes a curved merging portion 54 which is curved about a radius of curvature $C_O$ which is spaced radially outwardly of the arm relative to a central axis X of the rotor that will receive the wedge 32. A circumferentially outermost curved contact portion 40 is curved about a radius of curvature centered on a point $C_1$ which is spaced inwardly of the portion 40. That is, curved contact portion 54 is curved inwardly while portion 40 is curved outwardly. A flat circumferentially outer surface or edge 56 of the arm is spaced by a distance $d_1$ from a plane Y which bisects wedge 32. In one embodiment, $d_1$ was 1.068 inches (2.713 centimeters).

A flat radially inner surface 57 extends from edge 56 and then merges into a curve 59 and another flat portion 61 leading into the leg 38. Leg 38 has a generally triangular shape, such that a side 63 of the leg 38 extends radially inwardly at a greater angle than does flat surface 61. A ledge 44 does not extend radially outwardly as far as does full surface 50, and merges into a radially inwardly extending flat surface 46. Flat surface 46 ends at a point 47 at a center point of an aperture 42.

Figure 3:
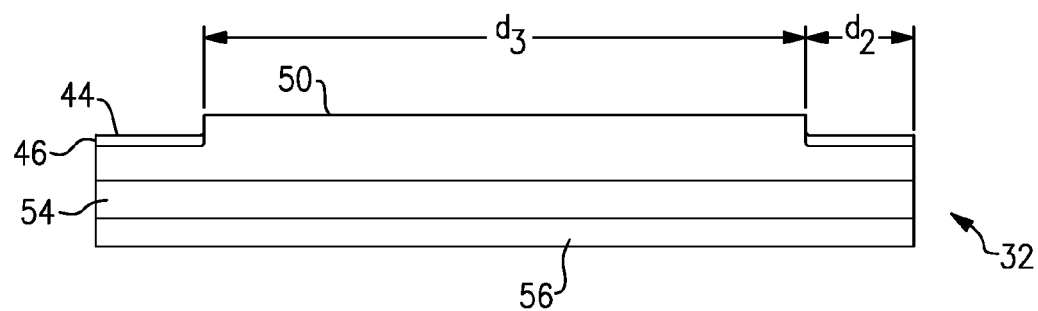
FIG. 3 is a side view of the wedge.

FIG. 3 shows the wedge 32 from a side. As shown, the ledge 44 defines a flat surface and extends along a center axis for an axial distance $d_2$. In one embodiment, $d_2$ was 0.812 inches (2.062 centimeters). A main body of the wedge including the full surface 50 extends for an axial distance $d_3$. In one embodiment, $d_3$ was 4.55 inches (11.6 centimeters).

In embodiments, the circumferential width of the arms, dimension $d_1$ is relatively great. A ratio of $d_1$ to $d_3$ may be between 0.20 and 0.25. In the prior art, the $d_1$ dimension was 0.35 inches and the $d_3$ dimension was 2.8 inches.

Further, a diameter D of aperture 42 is relatively great. In one embodiment, D was 0.5 inch (1.27 centimeters). In an embodiment, a ratio of D to $d_3$ was between 0.085 and 0.115. In the prior art, D was 0.25 inches.

Figure 4:
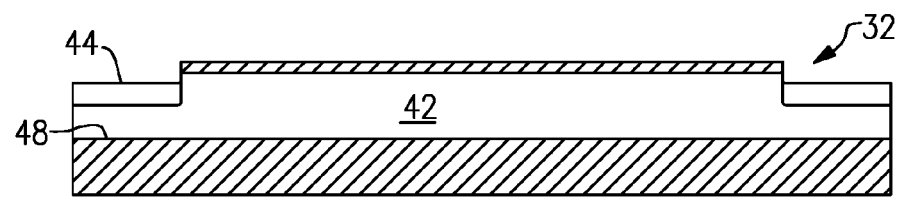
FIG. 4 is a cross-sectional view along line 4-4 as shown in FIG. 2.

FIG. 4 shows the aperture 42 and a part aperture portion 48 which is found along the ledge 44.

In a method, a machine 20 has a stator 22 and a rotor 24 including a lamination stack 28 having a plurality of poles 35 extending radially outwardly from a central axis. The poles 35 have pole tips 34 extending circumferentially at circumferential sides of the poles 35. Field coils 30/31 are wound around each pole piece. Between any two adjacent poles 35 there are portions of two field coils 30/31. Wedges are positioned circumferentially intermediate portions of the field coils. One of the wedges 32 is removed and replaced. The replacement wedge 32 is structured as described above.

Although an embodiment of this invention has been disclosed, a worker of ordinary skill the art would recognize that certain modifications would come within the scope of this invention. For that reason, the following claims should be studied to determine the true scope and content of this invention.

The invention claimed is:

1. A wedge for use in an electric machine comprising:
   a central leg extending in a direction that will be radially inward when the wedge is mounted on a lamination stack, and said wedge having arms extending in both circumferential directions from said central leg, with a circumferentially outermost part of said arms having a curved contact surface that will be radially outward, and a flat inner surface that will be radially inward when the wedge in mounted in the lamination stack;
   said wedge having a radially outer full surface and a cylindrical aperture through an axial length of said full surface, and ledge surfaces at each axial end of said full surface of said wedge; and
   a curved merging portion on an outer surface of said arms merging into a curved contact surface, said curved merging portion being formed on a radius of curvature centered from a point that will be spaced radially outwardly of said arm when said wedge is mounted on a lamination stack, and said curved contact portion being formed about a radius of curvature centered on a point that will be spaced radially inwardly of said curved contact surface when the wedge is mounted on a lamination stack.

2. The wedge for use in an electric machine as set forth in claim 1, wherein said aperture defining a diameter and said full surface of said wedge extending for an axial distance, and a ratio of said diameter to said axial distance being between 0.085 and 0.115.

3. The wedge for use in an electric machine as set forth in claim 2, wherein a circumferential width is defined from a plane which bisects said wedge to a circumferentially outer flat edge on said arm, and a ratio of said circumferential width to said axial distance being between 0.20 and 0.25.

4. The wedge for use in an electric machine as set forth in claim 1, wherein a circumferential width is defined from a plane which bisects said wedge to a circumferentially outer flat edge on said arm, and the full surface extending for an axial distance and a ratio of said circumferential width to said axial distance being between 0.20 and 0.25.

5. The wedge for use in an electric machine as set forth in claim 4, wherein said flat inner surface extends from said edge, and merges into a merging flat surface leading into the leg, said leg has a generally triangular shape, and a side of the leg extends radially inwardly at a greater angle than does merging flat surface, said ledges do not extend radially outwardly as far as said full surface, and merge into a radially inwardly extending flat surface, which ends at a center point of the cylindrical aperture.

6. A machine rotor comprising:
   a lamination stack having a plurality of poles extending radially outwardly from a central axis, and said poles having pole tips extending circumferentially at circumferential sides of said poles;
   field coils wound around each of said poles, such that between any two adjacent poles, there are portions of two field coils;
   a wedge positioned circumferentially intermediate said portions of said field coils, with a central leg extending radially inwardly to separate said portions of said field coils, and said wedge having circumferentially extending arms extending circumferentially to be radially inward of said pole tips on said lamination stack, with a curved contact surface on a circumferentially outermost portion of said wedge being in contact with a surface on a radially inward portion of said pole tip;
   said wedge having a radially outer full surface and a cylindrical aperture through an axial length of said full surface, and ledge surfaces at each axial end of said full surface of said wedge; and
   a curved merging portion on an outer surface of said arms merging into a curved contact surface, said curved merging portion being formed on a radius of curvature centered from a point that will be spaced radially outwardly of said arm when said wedge is mounted on a lamination stack, and said curved contact portion being formed about a radius of curvature centered on a point that will be spaced radially inwardly of said curved contact surface when the wedge is mounted on a lamination stack.

7. The machine rotor as set forth in claim 6, wherein said aperture defining a diameter and said full surface of said wedge extending for an axial distance, and a ratio of said diameter to said axial distance being between 0.085 and 0.115.

8. The machine rotor as set forth in claim 7, wherein a circumferential width is defined from a plane which bisects said wedge to a circumferentially outer flat edge on said arm, and a ratio of said circumferential width to said axial distance being between 0.20 and 0.25.

9. The machine rotor as set forth in claim 6, wherein a circumferential width is defined from a plane which bisects said wedge to a circumferentially outer flat edge on said arm, the full surface extending for an axial distance and a ratio of said circumferential width to said axial distance being between 0.20 and 0.25.

10. The machine rotor as set forth in claim 6, wherein said flat inner surface extends from said edge, and merges into a merging flat surface leading into the leg, said leg has a generally triangular shape, and a side of the leg extends radially inwardly at a greater angle than does merging flat surface, said ledges do not extend radially outwardly as far as said full surface, and merge into a radially inwardly extending flat surface, which ends at a center point of the cylindrical aperture.

11. A machine comprising:
   a stator;
   a rotor including a lamination stack having a plurality of poles extending radially outwardly from a central axis, and said poles having pole tips extending circumferentially at circumferential sides of said poles, field coils wound around each of said poles, such that between any two adjacent poles, there are portions of two field coils;
   a wedge positioned circumferentially intermediate said portions of said field coils, with a central leg extending radially inwardly to separate said portions of said field coils, and said wedge having circumferentially extending arms extending circumferentially to be radially inward of said pole tips on said lamination stack, with a curved contact surface on a circumferentially outermost portion of said wedge being in contact with a surface on a radially inward portion of said pole tip;

said wedge having a radially outer full surface and a cylindrical aperture through an axial length of said full surface, and ledge surfaces at each axial end of said full surface of said wedge; and a curved merging portion on an outer surface of said arms merging into a curved contact surface, said curved merging portion being formed on a radius of curvature centered from a point that will be spaced radially outwardly of said arm when said wedge is mounted on a lamination stack, and said curved contact portion being formed about a radius of curvature centered on a point that will be spaced radially inwardly of said curved contact surface when the wedge is mounted on a lamination stack.

12. The machine as set forth in claim 11, wherein said aperture defining a diameter and said full surface of said wedge extending for an axial distance, and a ratio of said diameter to said axial distance being between 0.085 and 0.115.

13. The machine as set forth in claim 12, wherein a circumferential width is defined from a plane which bisects said wedge to a circumferentially outer flat edge on said arm, and a ratio of said circumferential width to said axial distance being between 0.20 and 0.25.

14. The machine as set forth in claim 11, wherein a circumferential distance is defined from a plane which bisects said wedge to a circumferentially outer flat edge on said arm, and the full surface extending for an axial distance, and a ratio of said circumferential width and said first axial distance being between 0.20 and 0.25.

15. A machine as set forth in claim 11, wherein said flat inner surface extends from said edge, and merges into a merging flat surface leading into the leg, said leg has a generally triangular shape, and a side of the leg extends radially inwardly at a greater angle than does merging flat surface, said ledges do not extend radially outwardly as far as said full surface, and merge into a radially inwardly extending flat surface, which ends at a center point of the cylindrical aperture.

16. A method of replacing a wedge on a machine comprising the steps of:

removing a wedge from a machine having a stator, and a rotor including a lamination stack having a plurality of poles extending radially outwardly from a central axis, and said poles having pole tips extending circumferentially at circumferential sides of said poles, and field coils wound around each of said poles, such that between any two adjacent poles there are portions of two field coils, the removed wedge previously positioned circumferentially intermediate said portions of said field coils;

replacing said removed wedge with a replacement wedge; and the replacement wedge having a central leg extending in a radially inward direction, and said wedge having arms extending in both circumferential directions from said central leg, with a circumferentially outermost part of said arms having a curved contact surface, and a radially inward flat inner surface, said wedge having a radially outer full surface and a cylindrical aperture through an axial length of said full surface, and ledge surfaces at each axial end of said full surface of said wedge, a curved merging portion on an outer surface of said arms merging into a curved contact surface, said curved merging portion being formed on a radius of curvature centered from a point spaced radially outwardly of said arm, and said curved contact portion being formed about a radius of curvature centered on a point spaced radially inwardly of said curved contact surface.

17. The method as set forth in claim 16, wherein said aperture defining a diameter and said full surface of said wedge extending for an axial distance, and a ratio of said diameter to said axial distance being between 0.085 and 0.115.

18. The method as set forth in claim 17, wherein a circumferential width is defined from a plane which bisects said wedge to a circumferentially outer flat edge on said arm, and a ratio of said circumferential width to said axial distance being between 0.20 and 0.25.

19. The method as set forth in claim 16, wherein a circumferential width is defined from a plane which bisects said wedge to a circumferentially outer flat edge on said arm, and the full surface extending for an axial distance and a ratio of said circumferential width to said axial distance being between 0.20 and 0.25.

20. A method as set forth in claim 16, wherein said flat inner surface extends from said edge, and merges into a merging flat surface leading into the leg, said leg has a generally triangular shape, and a side of the leg extends radially inwardly at a greater angle than does merging flat surface, said ledges do not extend radially outwardly as far as said full surface, and merge into a radially inwardly extending flat surface, which ends at a center point of the cylindrical aperture.

* * * * *